UNITED STATES PATENT OFFICE.

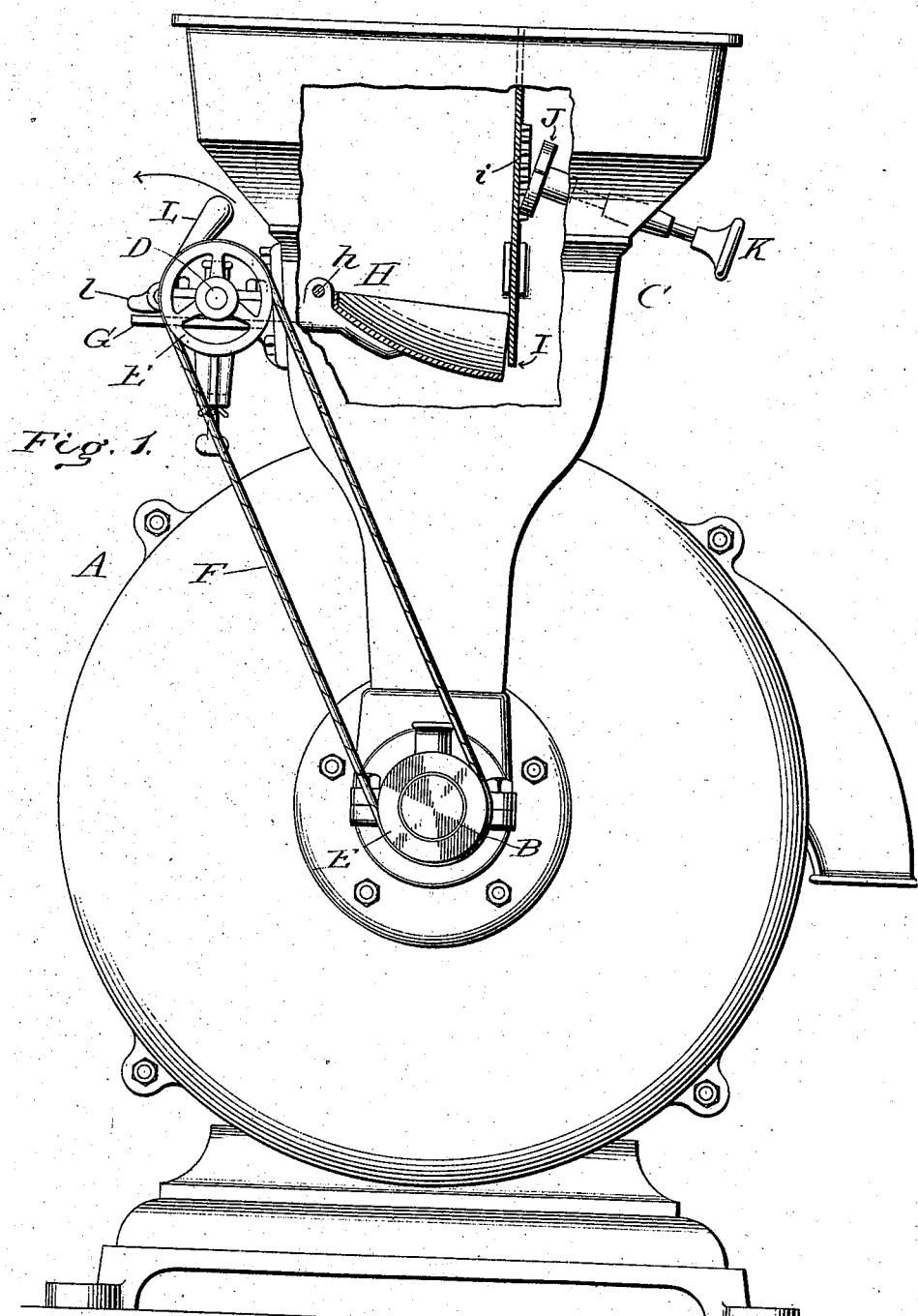

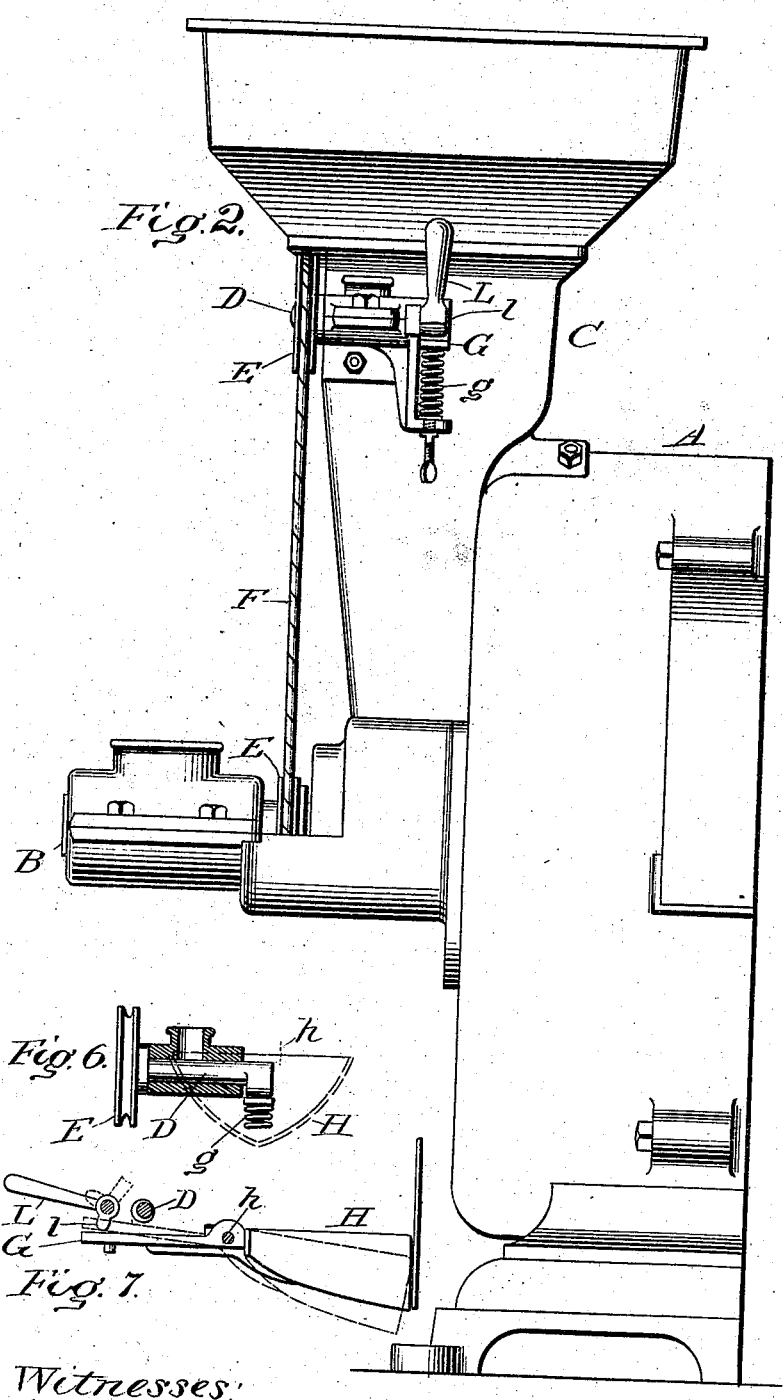

SIMON SNYDER, OF MUNCY, PENNSYLVANIA, ASSIGNOR TO SPROUT, WALDRON & COMPANY, OF MUNCY, PENNSYLVANIA, A CORPORATION OF PENNSYLVANIA.

FEED APPARATUS FOR MILLS.

No. 894,756.  Specification of Letters Patent.  Patented July 28, 1908.

Application filed January 26, 1905. Serial No. 242,752.

*To all whom it may concern:*

Be it known that I, SIMON SNYDER, a citizen of the United States, residing at Muncy, in the county of Lycoming and State of Pennsylvania, have invented certain new and useful Improvements in Feed Apparatus for Mills; and I do hereby declare the following to be a full, clear, and exact description of the invention, such as will enable others skilled in the art to which it appertains to make and use the same.

This invention relates to feeding-apparatus or feed-regulators for facilitating the feeding to mills of the material to be ground and at the same time giving an even and constant or uniform flow of the material to the grinding surfaces. It is particularly adapted for feeding granular or similar material to burs, attrition and other grinding mills, especially where the particles of the material are uneven or vary considerably in size, as crushed corn-cobs for instance. But, except for the specific improved form of vibratory shoe, the invention is susceptible of general utility, as a feed regulator for any type of mill, for example, crushing-rolls.

The principal objects attained are: (1) simplicity of construction and effective operation of the apparatus and its several elements; (2) even and constant or uniform feed of the material, especially when composed of particles of various sizes; (3) instant cut-off of the feed, and quick renewal of the same at will; (4) regulation of the feed to the slightest extent desired; (5) quick control of the actuating mechanism, for throwing the vibratory shoe into and out of action; (6) easy-running and noiseless action of the mechanism, and relatively slight motion for imparting the necessary vibratory-movement to the shoe, and (7) convenience in manipulation and control of the apparatus.

To these ends, the invention embraces a novel form of vibratory shoe, for facilitating the feeding of the material, and confining the feed to a more or less narrow stream; a gate or slide associated therewith for regulating the amount or quantity of feed as desired, which may be done to a nicety by virtue of the improved form of the shoe; improved means for operating the slide; novel and exceedingly effective mechanism for actuating or vibrating the shoe; a quick-acting device for throwing the actuating mechanism into and out of operation, to cut-off and resume the feed at will; and the combination of such improvements in an exceedingly reliable, certain and efficient apparatus.

Without limitation to the specific construction illustrated, since the same is susceptible of modification in details of arrangement and structure of parts, the invention will be fully described, by reference to the accompanying drawings, which form a part of this specification, and then particularly pointed out and defined in the claims annexed.

In said drawings: Figure 1 is a side elevation of a part of an ordinary vertical bur mill, equipped with feeding apparatus embodying my invention; the hopper having a part of its side broken away to disclose the vibratory shoe and the regulating slide or gate therefor. Fig. 2 is a front elevation of the same. Fig. 3 is a detail face view of the slide or gate. Fig. 4 is a detail face view of the cam shown for operating the slide. Fig. 5 is a front end view of the shoe. Fig. 6 is a detail view of the eccentric-shaft and its bearing. Fig. 7 is a side view of the shoe shown in inoperative position, with dotted lines indicating it in working position. Fig. 8 is a front end view of another form of shoe.

A particular explanation of the illustrated machine is as follows:

A indicates the mill casing, inclosing the burs or grinding-disks to which material is to be fed.

B is the runner-shaft.

C is the hopper, such as ordinarily used for feeding a bur, attrition or other grinding mill. In this case the hopper feeds through an eye in one of the disks or burs, which, however is not shown, this being a familiar construction.

D is a short eccentric shaft, or a shaft having an eccentric thereon. It is securely boxed to the hopper by any proper bearing. Motion is imparted to this eccentric shaft from the grinder shaft by pulleys E E and belt F. This eccentric shaft imparts a vibratory motion to the lever G, which is attached to or rigid with the vibratory shoe H, the shoe being pivoted at h in the hopper. In the construction shown, the eccentric shaft operates above the lever G, which extends outward as a tail piece from the shoe; said shaft thus limiting the upward movement of the lever and holding the shoe in proper position. The point on the lever wearing directly upon the eccentric is supplied with a raw hide or other suitable bearing which may be renewed easily as occasion requires. The lever is held in contact with the eccentric by a spring g, with the necessary attachment of bolt and nut to tension the same properly.

The shoe H is of peculiar construction, preferably slanting downward from its pivot or rear end to its front or discharge end, and having its front approximately the shape of the end segment of an ellipse; the middle of the shoe being the lowest line. In other words, at the front, the sides of the shoe slant or curve downward toward the middle, which is the lowest point; and preferably the bottom of the shoe merges gradually into this shape. This construction confines the feed to a more or less narrow stream, according to the opening at the end of the shoe which is controlled by the slide or gate I; it enables the fine adjustments or regulations of the quantity of feed to be made; and when only a small quantity of material is being fed to the mill, the opening under the slide will be large enough for particles or lumps of considerable size to pass out under the slide. The front edge of the shoe may be shaped to an arc, or preferably on a slight miter cut, so that the vibratory movement of the shoe is not restricted or bound by the gate in the way.

The amount of material discharged from the shoe is regulated by raising and lowering the slide I, which it will be observed, controls the discharge from the shoe instead of the feed to the shoe. This arrangement, in connection with the peculiar form of the shoe, enables the operator to regulate the flow to a nicety, and restrict the opening to a very slight degree. The slide travels in any suitable guides in the hopper. This construction is especially advantageous for regulating the feed of materials of uneven size, such as crushed corn and cobs. The action of the crusher does not always reduce the cobs to a small size, so that there are frequently pieces as large as ⅝ or ¾ of an inch that must feed to the mill. Were the outlet from the shoe of any considerable width and height, enough for these pieces to pass through, it is evident that there would be fed to the mill three or four times as much stock as it could grind; but by having the aforesaid peculiar form of the shoe, the stock is gathered together at one point and is fed through a space which will allow the larger particles to go through, while yet the discharge is along a narrow line. Were the outlet several inches wide, then by adjusting the gate only a slight distance above, the increase in the feed would be considerable; but with this improved construction a considerable adjustment of the slide is necessary in order to substantially increase the amount of stock going to the grinding-disks.

For operating the slide, any appropriate means may be employed; but I have provided an improved device for this purpose, according to which the slide is held in position and controlled by a cam-wheel J, having helical or involute grooves engaging a vertical series of cogs i on the slide; the cam being disposed at such an angle to the gate that only one or two grooves on one side of the cam engage the cogs on the slide. A desirable arrangement is to have one rotation of the hand-wheel K cause the slide to move two cogs; and the pitch of these cogs being one-half inch, each revolution will adjust the gate one inch upward or downward as desired. By this device, it is impossible for any jar or shaking of the slide to change its adjustment, as the slide resting on the lower part of the cam by its own weight prevents vertical movement unless the hand-wheel K is revolved from the outside of the hopper.

For the purpose of stopping the feed of material, a cut-off lever L is fulcrumed above the lever G; said lever L having a toe or tail-piece l out of contact with lever G during vibration of the shoe; but by throwing lever L forward in the direction of the arrow (Fig. 1), its toe depresses lever G below the reach or throw of the eccentric of shaft D; so that the shoe remains stationary while the eccentric shaft continues to revolve. Reversing this operation, that is throwing the lever L back to its former position, instantly imparts motion to the shoe and the feeding is resumed.

In operation, the vibration of the shoe moves the stock gradually toward the gate or slide, and the motion agitates the material next to the slide, keeping it in good condition to flow and discharge rapidly; while at the opposite side of the pivot h there is very little motion. The whole construction is exceedingly simple, the operation easy and noiseless, and the action reliable and certain.

The advantage in having the gate at the front of the shoe is the perfect control of the amount of feed, as already explained. It is very difficult to control the feed by a slide above the shoe. In those constructions where the feed is controlled by a gate above the shoe, there is always a quantity of stock below the slide that will feed into the mill after the slide is closed, and in some instances this amounts to considerable. But in my improved apparatus, the instant the lever L is thrown down, the feed stops and does not allow a particle more to be fed into the mill, so that it is instantly empty. Throwing up said lever instantly resumes the feed. This is a valuable point when it is desired to stop the mill suddenly. For to stop a mill while the stock is feeding makes it very difficult to start again unless the disks are separated. But with the present apparatus, a mill can be stopped or started without changing its grinding adjustment.

The apparatus has the further advantage of being small and compact, occupying less space than any other feeding device with which I am acquainted.

I claim as my invention and desire to secure by Letters Patent of the United States:—

1. A feed-regulator having, in combination, a horizontally-disposed vibratory feed-shoe so shaped as to provide an open discharge end of approximately the form of an end segment of an ellipse, means for operating said shoe to produce an up and down vibratory motion of its said discharge end, an independent vertically-disposed gate arranged adjacent to and across the said open discharge end of the shoe, and means for vertically-adjusting said gate to regulate the size of the opening thereunder for discharge of material from the shoe, the bottom of the gate adapted to extend clear across the open end of the shoe at various elevations of the gate, thereby confining the discharge to the medial portion of the shoe through an approximately triangular passage.

2. A feed-regulator having, in combination, a horizontally-disposed vibratory feed-shoe having an open discharge end and its opposite side slanting downward convergingly to the medial lowermost line, means for operating said shoe to produce an up and down vibratory motion of its said discharge end, an independent gate arranged adjacent to and across the said open discharge end of the shoe, whereby an approximately triangular opening for discharge of material is provided between the bottom of said gate and opposite sides of the discharge end of the shoe, and means for up and down adjustment of the gate to enlarge and restrict said opening.

3. A feed-regulator having, in combination, a horizontally-disposed vibratory feed-shoe having an open front discharge end and having a tail-lever extending rearwardly from its pivot, a rotary device operating directly on said tail-lever to vibrate said shoe, and a hand-lever having an arm adapted to engage said tail-lever for moving and sustaining said tail-lever out of reach of said device to stop vibration at will.

4. A feed-regulator having, in combination, a vibratory feed-shoe pivoted on a horizontal axis and having a tail-lever, a rotary device operating on said lever to vibrate said shoe, a spring holding said lever yieldingly in contact with said device, and an independent throw-out lever having an arm adapted to engage and move and sustain said first-mentioned lever out of reach of said device when said throw-out lever is moved to throw-out position.

5. A feed-regulator having, in combination, a hopper for feeding material to the mill, a vibrating shoe therein for receiving such material and discharging the same, a vertically movable gate or slide adjustable across the discharge end of the shoe, a hand-wheel outside the hopper, and mechanism controlled thereby for adjusting the slide, an inclined rod operated by the hand-wheel and having a cam-wheel at an angle to the slide having helical grooves or ribs engaging a rack or cogs or grooves on the slide.

In testimony whereof I affix my signature, in presence of two witnesses.

SIMON SNYDER.

Witnesses:
CHARLES N. HOLLEY,
FREDERICK C. PETERMAN.